(12) United States Patent
Choi et al.

(10) Patent No.: US 9,598,519 B2
(45) Date of Patent: Mar. 21, 2017

(54) RESIN FOR BLISTER PACKAGE AND PREPARATION METHOD THEREOF

(71) Applicant: Hanwha Chemical Corporation, Seoul (KR)

(72) Inventors: Jeong Hyun Choi, Daejeon (KR); Sin-Won Kang, Daejeon (KR); Jung Ho Kong, Daejeon (KR); Sang Hyun Cho, Daejeon (KR)

(73) Assignee: Hanwha Chemical Corporation (KR)

( * ) Notice: Subject to any disclaimer, the term of this patent is extended or adjusted under 35 U.S.C. 154(b) by 0 days.

(21) Appl. No.: 14/758,021

(22) PCT Filed: Dec. 17, 2013

(86) PCT No.: PCT/KR2013/011744
§ 371 (c)(1),
(2) Date: Jun. 26, 2015

(87) PCT Pub. No.: WO2014/109488
PCT Pub. Date: Jul. 17, 2014

(65) Prior Publication Data
US 2015/0361202 A1    Dec. 17, 2015

(30) Foreign Application Priority Data
Jan. 8, 2013 (KR) .................. 10-2013-0002249

(51) Int. Cl.
C08F 220/14 (2006.01)
C09D 133/10 (2006.01)
C09J 133/08 (2006.01)
C09J 133/12 (2006.01)

(52) U.S. Cl.
CPC .......... *C08F 220/14* (2013.01); *C09D 133/10* (2013.01); *C09J 133/08* (2013.01); *C09J 133/12* (2013.01)

(58) Field of Classification Search
CPC ...... C08F 220/14; C09J 133/12; C09J 133/08; C09D 133/10
USPC .................................................. 526/319
See application file for complete search history.

(56) References Cited

U.S. PATENT DOCUMENTS 5,728,793 A    3/1998    Kumagai et al.
6,608,143 B1   8/2003    Fukuoka et al.

FOREIGN PATENT DOCUMENTS

| CN | 1068339 C | | 7/2001 |
|---|---|---|---|
| JP | 2008266439 A | * | 11/2008 |
| KR | 1998-0703334 A | | 10/1998 |
| KR | 2001-0053452 A | | 6/2001 |
| KR | 10-0301126 B1 | | 9/2001 |
| KR | 2001-0111318 A | | 12/2001 |
| KR | 10-0319421 B1 | | 4/2002 |
| KR | 2007-0090331 A | | 9/2007 |
| KR | 1020070090331 A | * | 9/2007 |
| KR | 2012-0040893 A | | 4/2012 |
| WO | 00037506 A1 | | 6/2000 |

OTHER PUBLICATIONS

International Search Report for Application No. PCT/KR2013/011744 dated Mar. 25, 2014.

* cited by examiner

*Primary Examiner* — Michael M Bernshteyn
(74) *Attorney, Agent, or Firm* — Lerner, David, Littenberg, Krumholz & Mentlik, LLP

(57) ABSTRACT

The present invention relates to a resin for a blister package and a preparation method thereof. The resin for a blister package according to the present invention is a water-soluble resin which can minimize a hazard to a human body due to residual of a solvent, and particularly, a resin layer formed by using the resin can show an excellent heat seal property and is hardly deformed at the heat seal temperature condition.

7 Claims, No Drawings

RESIN FOR BLISTER PACKAGE AND PREPARATION METHOD THEREOF

CROSS-REFERENCE TO RELATED APPLICATION

This application is a national phase entry under 35 U.S.C. §371 of International Application No. PCT/KR2013/011744, filed Dec. 17, 2013, which claims priority to Korean Patent Application No. 10-2013-0002249, filed Jan. 8, 2013, the disclosures of which are incorporated herein by reference.

TECHNICAL FIELD

The present invention relates to an adhesive resin which can be applied to blister package, a preparation method thereof, and the use thereof.

BACKGROUND OF ART

A blister package is formed in a packaging method of forming a container by heating and shaping a plastic sheet to form one or more sunken spaces, putting an article to be stored in the container, covering the opening part of the container with a substrate such as paper, cardboard, a plastic film, an aluminum foil, and so on, and sealing the surrounding of the article. Such blister package is being applied to various fields of foods, batteries, toothbrushes, pharmaceuticals, stationery, and so on, because it can raise a demonstration effect by exposing the product through the shaped transparent parts, and it is possible to write specific information on the opposite substrate.

The plastic container and the substrate in the blister package are generally bonded by heat sealing. For this reason, the plastic container is made of a resin having a heat seal property. The substrate is also coated with the resin having a heat seal property. Therefore, the resins for a blister package basically require not only the heat seal property but also suitability of coating to be coated on the substrate.

Heretofore, a solvent-based resin solution has been used as the coating solution having a heat seal property. However, there is a fire risk due to the flammability of the solvent-based resin and a problem that an organic solvent may remain in the package. Particularly, since the blister package is mainly used for foods, pharmaceuticals, and stationery, and the organic solvent directly affects a human body when it remains in the package, the solvent-based resin is not preferable for the uses.

To make up for this disadvantage, the method of using a waterborne styrene-acrylate resin as a resin for a blister package was suggested. However, the resins for a blister package that have been suggested until now are poor in heat seal property in comparison to prior solvent-based resins at the same temperature condition, and there is still a problem that the plastic container is deformed when it is heated to the level of heat adhesion.

DETAILED DESCRIPTION OF THE INVENTION

Technical Problem

It is an aspect of the present invention to provide a resin for a blister package which is superior in heat seal property and coating property on a substrate, and that is not harmful to a human body.

It is another aspect of the present invention to provide a preparation method of the resin for a blister package.

It is still another aspect of the present invention to provide a heat adhesive resin layer for a blister package prepared from a composition including the resin.

Technical Solution

According to the present invention, a resin for a blister package, prepared from a composition including:
monomer compounds including 75 to 95 weight % of the compound of the following Chemical Formula 1, and 5 to 25 weight % of the compound of the following Chemical Formula 2;
a polymerization initiator; and
a solvent is provided:

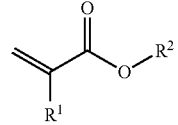

[Chemical Formula 1]

in Chemical Formula 1, $R^1$ is hydrogen or a methyl group, $R^2$ is a $C_1$-$C_{10}$ linear or branched alkyl group; and

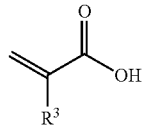

[Chemical Formula 2]

in Chemical Formula 2, $R^3$ is hydrogen or a methyl group.

The composition may include 0.01 to 1 parts by weight of the polymerization initiator and 5 to 20 parts by weight of the solvent per 100 parts by weight of the monomer compounds.

The compound of Chemical Formula 1 may include one or more compounds selected from the group consisting of methylacrylate, ethylacrylate, isopropylacrylate, butylacrylate, methylmethacrylate, ethyl methacrylate, hexylacrylate, and 2-ethylhexylacrylate.

The compound of Chemical Formula 2 may be acrylic acid, methacrylic acid, or a mixture thereof.

Particularly, the monomer compounds may include at least 2 kinds of the compounds of Chemical Formula 1 and at least 2 kinds of the compounds of Chemical Formula 2, and may preferably include methylmethacrylate, ethylacrylate, acrylic acid, and methacrylic acid.

The resin may have a weight average molecular weight of 4000 to 30,000, an acid value of 35 to 105 KOH mg/g, and a glass transition temperature of 45 to 65° C.

In addition, according to the present invention, a preparation method of the resin for a blister package, including the step of carrying out continuous bulk polymerization of a composition including monomer compounds including 75 to 95 weight % of the compound of the following Chemical Formula 1 and 5 to 25 weight % of the compound of the following Chemical Formula 2, a polymerization initiator, and a solvent at the temperature of 150 to 250° C. is provided.

According to the present invention, a heat adhesive resin layer for a blister package prepared from the composition including the resin for blister package is provided.

Advantageous Effects

The resin for a blister package according to the present invention is a water-soluble resin which can minimize the hazard to a human body due to the residual of solvent, and particularly, the resin layer formed by using the resin can show excellent heat seal property and is hardly deformed at the heat seal temperature condition. Therefore, the resin layer or a film prepared by using the resin can be usefully applied in the use of a blister package.

DETAILED DESCRIPTION OF THE EMBODIMENTS

Hereinafter, the resin for a blister package and the preparation method thereof according to embodiments of the present invention are explained.

Prior to this, technical terms in the present specification are only for mentioning specific embodiments and they are not intended to restrict the present invention unless there is a particular mention about them.

Singular expressions used herein may include the plural expressions unless they are differently expressed contextually.

The meaning of the term "include" used in the specification embodies specific characteristics, areas, essence, steps, actions, elements, or components, and does not exclude existence or addition of other specific characteristics, areas, essence, steps, actions, elements, or components.

In the process of continuing studies about a resin for a blister package, the present inventors recognized that a resin of which the weight average molecular weight is large and an acid value and a glass transition temperature are low can be formed by polymerizing only acrylate compounds and acrylic acid compounds as the monomer compounds for preparing a resin for a blister package with a specific composition ratio.

Furthermore, the present inventors recognized that the resin can minimize the hazard to a human body due to the residual of a solvent because it is a water-soluble resin, and it has excellent coating property on the substrate. Particularly, the present inventors recognized that the resin layer formed by using the resin is usefully applied in the use of a blister package because it shows an excellent heat seal property even at a low temperature and is hardly deformed at the heat seal temperature condition, and accomplished the present invention.

According to one embodiment of the present invention, a resin for a blister package, prepared from a composition including:

monomer compounds including 75 to 95 weight % of the compound of the following Chemical Formula 1, and 5 to 25 weight % of the compound of the following Chemical Formula 2;
    a polymerization initiator; and
    a solvent is provided:

[Chemical Formula 1]

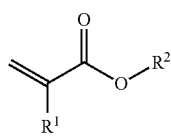

in Chemical Formula 1, $R^1$ is hydrogen or a methyl group, and $R^2$ is a $C_1$-$C_{10}$ linear or branched alkyl group; and

[Chemical Formula 2]

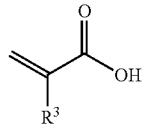

in Chemical Formula 2, $R^3$ is hydrogen or a methyl group.

That is, the resin for a blister package according to the present invention is formed from the composition including the monomer compounds, the polymerization initiator, and the solvent.

The composition includes only the acrylate compound represented by Chemical Formula 1 and the acrylic acid compound represented by Chemical Formula 2 as the monomer compounds, and the water soluble resin can be provided by polymerizing the compounds.

Particularly, since the resin for a blister package according to the present invention is prepared from the composition including the compounds represented by Chemical Formulae 1 and 2 with the content ratio of controlled specific ranges, it can show the characteristics of higher weight average molecular weight and lower glass transition temperature than the resin obtained by including prior styrene monomer compounds.

Furthermore, the resin layer formed by using the resin for a blister package according to the present invention can exhibit the properties suitable for the use of blister package, because it can show an excellent heat seal property even at a low temperature and is hardly deformed at the heat seal temperature condition.

In the present invention, the monomer compounds included in the composition may be composed of 75 to 95 weight % (preferably 80 to 95 weight %, more preferably 85 to 95 weight %) of the compound of Chemical Formula 1, and 5 to 25 weight % (preferably 5 to 20 weight %, more preferably 5 to 15 weight %) of the compound of Chemical Formula 2.

That is, the composition does not include other kinds of monomers (for example, a styrene monomer and so on) except the compound of Chemical Formula 1 and the compound of Chemical Formula 2. Here, the styrene monomer has been used while being mixed with alkylacrylate compounds and the like, because it is inexpensive and superior in stiffness. However, the styrene monomer is not suitable for a resin for a blister package because it is inferior in adhesion to a substrate due to its brittle characteristic and a film prepared by using the resin turns yellow.

In order to sufficiently secure the weight average molecular weight and the glass transition temperature required of the resin, it is preferable that the content of the compound of Chemical Formula 1 in the monomer compounds be 75 weight % or more, and in order to secure the acid value required of the resin, it is preferable that the content of the compound of Chemical Formula 2 in the monomer compounds be 5 weight % or more.

However, the weight average molecular weight, the glass transition temperature, and the acid value are not properties that are independently determined by the compound of Chemical Formula 1 or 2, and they can be organically determined by a total combination of monomer compounds including the compounds of Chemical Formulae 1 and 2.

Here, any monomer compounds represented by Chemical Formulae 1 and 2 can show the similar effect required of the present invention. For example, according to the present invention, the compound of Chemical Formula 1 may be one or more compounds selected from the group consisting of methylacrylate, ethylacrylate, isopropylacrylate, butylacrylate, methylmethacrylate, ethylmethacrylate, hexylacrylate, and 2-ethylhexylacrylate, and the compound of Chemical Formula 2 may be acrylic acid, methacrylic acid, or a mixture thereof.

In addition, according to the present invention, it may be preferable that the monomer compounds include at least 2 kinds of the compounds of Chemical Formula 1 and at least 2 kinds of the compounds of Chemical Formula 2, and by this, it becomes possible to more effectively obtain the resin having the weight average molecular weight, the glass transition temperature, and the acid value required of the present invention.

According to one embodiment of the present invention, the monomer compounds may include methylmethacrylate, ethylacrylate, acrylic acid, and methacrylic acid. For more specific examples, the monomer compounds may include 53 to 60 weight % of methylmethacrylate, 30 to 35 weight % of ethylacrylate, 3.5 to 6 weight % of acrylic acid, and 1.5 to 6 weight % of methacrylic acid.

That is, in said one embodiment, methylmethacrylate included in the monomer compounds may provide the final resin with adhesion to a substrate, stiffness, coating gloss, and print suitability. However, an excess of methylmethacrylate may make it difficult to secure the molecular weight required of the present invention, and thus it is preferable that the content of methylmethacrylate in the total monomer compounds is 60 weight % or less.

The ethylacrylate included in the monomer compounds is an acrylate compound having a low glass transition temperature (about −24° C.), and it lowers the glass transition temperature of the final resin and makes it possible to exhibit excellent heat seal property even at a low temperature condition.

However, ethylacrylate is not easy to handle because of its pungent odor, and thus the content of the same in the total monomer compounds may preferably be 30 to 35 weight % by considering the weight average molecular weight and the glass transition temperature required for the present invention and the characteristic of ethylacrylate together. Further, the contents of acrylic acid and methacrylic acid may be 3.5 to 6 weight % and 1.5 to 6 weight %, respectively by considering the acid value required for the present invention and reactivity with the acrylate compounds.

Methacrylic acid may be advantageous for giving gloss and re-solubility to the final resin, but it may be inferior to acrylic acid in terms of reactivity. Therefore, as a nonrestrictive example, a preferable mixing ratio of acrylic acid and methacrylic acid may be 60:40 to 70:30.

The composition for forming the resin for a blister package according to the present invention may include the polymerization initiator and the solvent.

Common polymerization initiators and solvents applicable to the polymerization of monomer compounds in the technical field to which the present invention pertains may be used unlimitedly.

For example, according to the present invention, the polymerization initiator may be a peroxide-based initiator, and preferably one or more compounds selected from the group consisting of tert-butyl peroxybenzoate (t-BPB), tert-butyl hydroperoxide (t-BHP), and di-tert-butyl peroxide (DTBPO).

At this time, the content of the polymerization initiator included in the composition may be determined by considering the polymerization efficiency of the composition, and preferably it may be 0.01 to 1 parts by weight, and more preferably 0.01 to 0.5 parts by weight, per 100 parts by weight of the monomer compounds.

Furthermore, according to the present invention, the solvent may be diethylene glycol monoethylether, dipropylene glycol methylether, water, or a mixture thereof; and preferably a mixture of diethylene glycol monoethylether or dipropylene glycol methylether and water. That is, the kind of the solvent may be determined by considering the polymerization efficiency of the composition and the effects on the properties of the final resin.

The content of the solvent may be 5 to 20 parts by weight, preferably 5 to 15 parts by weight, per 100 parts by weight of the monomer compounds. When the mixed solvent including water is used as the solvent, it is preferable that the content of water included in the mixture is 10 to 25 weight % based on the total weight of the mixture solvent, because the turbidity of the composition increases and it may become difficult to obtain the resin having desired properties when an excess of water is included therein.

As disclosed above, the resin for a blister package prepared from the composition including the monomer compounds, the polymerization initiator, and the solvent may have a weight average molecular weight of 4000 to 30,000, preferably 8000 to 25,000, and more preferably 10,000 to 25,000. Accordingly, the resin layer formed by using the resin is superior in basic mechanical properties, and particularly can exhibit the characteristic that it is almost never deformed at the heat seal temperature condition.

Furthermore, the resin for a blister package of the present invention may show an acid value of 35 to 105 KOH mg/g, preferably 35 to 95 KOH mg/g, and more preferably 35 to 80 KOH mg/g. In addition, the resin may show a glass transition temperature of 45 to 65° C., preferably 45 to 55° C., and more preferably 45 to 50° C. According to this, the resin can exhibit an excellent heat seal property even at a low temperature condition, and can show excellent coating property when it is made into a solution and coated on a substrate.

In addition, according to another embodiment of the present invention, a preparation method of the resin for a blister package, including the step of carrying out continuous bulk polymerization of a composition including monomer compounds including 75 to 95 weight % of the compound of the following Chemical Formula 1 and 5 to 25 weight % of the compound of the following Chemical Formula 2, a polymerization initiator, and a solvent at the temperature of 150 to 250° C., is provided.

That is, the preparation method of the resin for a blister package according to the present invention may be carried out by a method of bulk-polymerizing said composition at a certain temperature condition, and the method may be carried out continuously.

The components of the composition and the content of each component are the same as above.

Further, the bulk polymerization may be carried out at a temperature condition of 150 to 250° C., preferably 180 to 240° C., and more preferably 190 to 230° C. by considering the polymerization efficiency of the composition. As disclosed above, a compound which can be activated at said temperature condition may be suitably used as the polymerization initiator included in the composition.

In the bulk polymerization, the retention time of the composition may be controlled to 10 to 60 minutes, preferably 10 to 40 minutes, and more preferably 15 to 25 minutes.

The resin for a blister package satisfying said weight average molecular weight, acid value, and glass transition temperature can be prepared by said method.

In addition, according to still another embodiment of the present invention, a heat adhesive resin layer for a blister package prepared from the composition including said resin is provided.

That is, the heat adhesive resin layer may be formed by using a composition prepared by dissolving the resin for a blister package in a certain solvent, and common coating devices and methods such as wire bar coating and so on may be applied.

The heat adhesive resin layer may be prepared by coating the composition including the resin on a substrate such as paper, cardboard, a plastic film, aluminum foil, and so on.

Such heat adhesive resin layer may be used for a blister package. That is, the blister package may be formed by a method of forming a container by heating and shaping a plastic sheet including the heat adhesive resin layer to form one or more sunken spaces, putting an article to be stored in the container, covering the opening part of the container with said substrate, and sealing the container by providing heat to the surroundings of the article.

Hereinafter, preferable examples are presented for better understanding of the present invention. However, the following examples are only for illustrating the present invention, and the present invention is not limited to or by them.

EXAMPLE 1

Synthesis of Resin

The monomer compounds including about 60 weight % of methylmethacrylate, about 35 weight % of ethylacrylate, about 3.5 weight % of acrylic acid, and about 1.5 weight % of methacrylic acid were prepared. The monomer compounds were put in a 1 L SUS reactor, and about 0.05 parts by weight of a polymerization initiator (tert-butyl peroxybenzoate) and about 11 parts by weight of a solvent (a mixed solvent including 82 weight % of dipropylene glycol methylether and 18 weight % of water) per 100 parts by weight of the monomer compounds were added thereto. The resin was obtained by carrying out a polymerization reaction at a temperature condition of about 198° C. for about 20 minutes.

(Preparation of Resin Solution)

After mixing about 40 weight % of the resin and about 58 weight % of a mixed solvent (deionized water to isopropyl alcohol=2:1 (weight ratio)), about 2 weight % of ammonia water (28% concentration) was added thereto dividedly 2~3 times while heating the mixture to about 70° C. And then, the resin solution was obtained by stirring the mixture for about 150 minutes.

EXAMPLE 2

Synthesis of Resin

The resin was obtained according to the same conditions and method as in Example 1, except that the polymerization was carried out by using the monomer compounds including about 58.6 weight % of methylmethacrylate, about 33.5 weight % of ethylacrylate, about 5.1 weight % of acrylic acid, and about 2.8 weight % of methacrylic acid.

(Preparation of Resin Solution)

After mixing about 40 weight % of the resin and about 57 weight % of a mixed solvent (deionized water to isopropyl alcohol=2:1 (weight ratio)), about 3 weight % of ammonia water (28% concentration) was added thereto dividedly 2~3 times while heating the mixture to about 70° C. And then, the resin solution was obtained by stirring the mixture for about 150 minutes.

EXAMPLE 3

Synthesis of Resin

The resin was obtained according to the same conditions and method as in Example 1, except that the polymerization was carried out by using the monomer compounds including about 55.5 weight % of methylmethacrylate, about 35 weight % of ethylacrylate, about 3.5 weight % of acrylic acid, and about 6.0 weight % of methacrylic acid.

(Preparation of Resin Solution)

After mixing about 40 weight % of the resin and about 56.4 weight % of a mixed solvent (deionized water to isopropyl alcohol=2:1 (weight ratio)), about 3.6 weight % of ammonia water (28% concentration) was added thereto dividedly 2~3 times while heating the mixture to about 70° C. And then, the resin solution was obtained by stirring the mixture for about 150 minutes.

EXAMPLE 4

Synthesis of Resin

The monomer compounds including about 54.5 weight % of methylmethacrylate, about 33.7 weight % of ethylacrylate, about 5.8 weight % of acrylic acid, and about 6.0 weight % of methacrylic acid were prepared. The monomer compounds were put in a 1 L SUS reactor, and about 0.03 parts by weight of a polymerization initiator (tert-butyl peroxybenzoate) and about 11 parts by weight of a solvent (a mixed solvent including 82 weight % of dipropylene glycol methylether and 18 weight % of deionized water) per 100 parts by weight of the monomer compounds were added thereto. The resin was obtained by carrying out a polymerization reaction at a temperature condition of about 190° C. for about 20 minutes.

(Preparation of Resin Solution)

After mixing about 40 weight % of the resin and about 55.9 weight % of a mixed solvent (deionized water to isopropyl alcohol=2:1 (weight ratio)), about 4.1 weight % of ammonia water (28% concentration) was added thereto dividedly 2~3 times while heating the mixture to about 70° C. The resin solution was obtained by stirring the mixture for about 150 minutes.

COMPARATIVE EXAMPLE

Synthesis of Resin

The monomer compounds including about 33.6 weight % of styrene, about 33.2 weight % of alpha-methyl styrene, and about 33.2 weight % of acrylic acid were prepared. The monomer compounds were put in a 1 L SUS reactor, and about 0.2 parts by weight of a polymerization initiator (tert-butyl peroxybenzoate) and about 11 parts by weight of a solvent (a mixed solvent including 82 weight % of dipropylene glycol methylether and 18 weight % of water) per 100 parts by weight of the monomer compounds were added thereto. The resin was obtained by carrying out a polymerization reaction at a temperature condition of about 221° C. for about 20 minutes.

(Preparation of Resin Solution)

After mixing about 40 weight % of the resin and about 50.4 weight % of a mixed solvent (deionized water to isopropyl alcohol=2:1 (weight ratio)), about 9.6 weight % of ammonia water (28% concentration) was added thereto dividedly 2~3 times while heating the mixture to about 70° C. The resin solution was obtained by stirring the mixture for about 150 minutes.

EXPERIMENTAL EXAMPLES

The following tests were carried out by using the resins and the resin solutions according to Examples 1 to 4 and a comparative example, and the results are listed in the following Table 1.

(1) Measurement of the molecular weight of the resin: the molecular weight of each resin prepared in Examples 1 to 4 and the comparative example was measured by Gel Permeation Chromatography (GPC). The standard specimen used in the measurement was polystyrene, and the specimens for the measurement prepared by dissolving each resin in tetrahydrofuran (THF) at a concentration of 0.1% were used. Further, in the GPC measurement, THF was used as the mobile phase and the velocity of flow was 1 ml/min.

(2) Measurement of the glass transition temperature: the glass transition temperature of each resin prepared in Examples 1 to 4 and the comparative example was measured by Differential Scanning Calorimetry (DSC). In the measurement, the temperature range was −50 to 200° C., and the heating rate was 10° C./min.

(3) Measurement of the acid value: after dissolving about 1.0 g of each resin prepared in Examples 1 to 4 and the comparative example in about 50 g of tetrahydrofuran (THF) and adding 5~6 ml of a phenolphthalein solution (1% concentration) thereto, the acid value of the resin was measured by titrating the same with a potassium hydroxide standard solution (KOH, 0.1 N).

(4) Measurement of the peel strength (evaluation on heat seal property): each resin composition prepared in Examples 1 to 4 and the comparative example was coated on a paper with a thickness of about 20.5 μm and dried at room temperature for about 30 minutes. Each specimen was prepared by thermal-bonding the coated paper prepared thus and a PVC film with a feat gradient tester. Then, the peel strength between the paper and the PVC film was measured by using a universal testing machine. Each specimen was measured 5 times, and the average values thereof are listed in the following Table 1. Larger peel strength indicates excellent better heat seal property.

TABLE 1

|  | Example 1 | Example 2 | Example 3 | Example 4 | Comparative Example |
|---|---|---|---|---|---|
| Number average molecular weight | 5625 | 5985 | 6881 | 10,393 | 5300 |
| Weight average molecular weight | 11,812 | 12,568 | 13,418 | 20,475 | 9500 |

TABLE 1-continued

|  | Example 1 | Example 2 | Example 3 | Example 4 | Comparative Example |
|---|---|---|---|---|---|
| Glass transition temperature (° C.) | 47 | 48 | 47 | 48 | 120 |
| Acid value (KOH mg/g) | 37 | 57 | 67 | 79 | 218 |
| Peel strength (kgf/cm$^2$) | 81 | 85 | 97 | 128 | — |

As shown in Table 1, the resin of the comparative example shows higher acid value and glass transition temperature than the resins of the examples, and the peel strength could not be measured because it had no adhesive strength to the PVC film.

In comparison to the resin of Comparative Example, it is recognized that the resins of Examples 1 to 4 are superior in heat seal property because they show not only high molecular weight and low acid value and glass transition temperature but also high peel strength. And, it is recognized that the higher molecular weight, the more improved the heat seal property is, in the case of similar acid value and glass transition temperature.

The invention claimed is:

1. A resin for blister package, prepared from a composition including:
    monomer compounds including 53 to 60 weight % of methyl methacrylate, 30 to 35 weight % of ethyl acrylate, 3.5 to 6 weight % of acrylic acid, and 1.5 to 6 weight % of methacrylic acid;
    a polymerization initiator; and
    a solvent.

2. The resin for a blister package according to claim 1, wherein the composition includes 0.01 to 1 parts by weight of the polymerization initiator and 5 to 20 parts by weight of the solvent per 100 parts by weight of the monomer compounds.

3. The resin for blister package according to claim 1, wherein the polymerization initiator is one or more compounds selected from the group consisting of tert-butyl peroxybenzoate, tert-butyl hydroperoxide, and di-tert-butyl peroxide.

4. The resin for blister package according to claim 1, wherein the solvent is diethylene glycol monoethylether, dipropylene glycol methylether, water, or a mixture thereof.

5. The resin for blister package according to claim 1, wherein the resin has a weight average molecular weight of 4000 to 30,000, an acid value of 35 to 105 KOH mg/g, and a glass transition temperature of 45 to 65° C.

6. A preparation method of a resin for a blister package, including:
    a step of carrying out continuous bulk polymerization of a composition including monomer compounds, a polymerization initiator, and a solvent at a temperature of 150 to 250° C.
    wherein the monomer compounds includes 53 to 60 weight % of methyl methacrylate, 30 to 35 weight % of ethyl acrylate, 3.5 to 6 weight % of acrylic acid, and 1.5 to 6 weight % of methacrylic acid.

7. A heat adhesive resin layer for a blister package, prepared from the composition including the resin for a blister package according to claim 1.

* * * * *